US012573545B2

(12) United States Patent
Ohguro et al.

(10) Patent No.: US 12,573,545 B2
(45) Date of Patent: Mar. 10, 2026

(54) INSULATING DEVICE AND ISOLATOR

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Tatsuya Ohguro, Kanazawa Ishikawa (JP); Kenichi Ootsuka, Oita Oita (JP); Mari Otsuka, Oita Oita (JP); Akira Ishiguro, Oita Oita (JP); Masaki Yamada, Oita Oita (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 1042 days.

(21) Appl. No.: 17/687,213

(22) Filed: Mar. 4, 2022

(65) Prior Publication Data

US 2023/0092162 A1 Mar. 23, 2023

(30) Foreign Application Priority Data

Sep. 21, 2021 (JP) ................................ 2021-153390

(51) Int. Cl.
*H01F 27/28* (2006.01)
*H01F 27/32* (2006.01)

(52) U.S. Cl.
CPC ....... *H01F 27/324* (2013.01); *H01F 27/2871* (2013.01)

(58) Field of Classification Search
CPC ............... H01F 27/324; H01F 27/2871; H01F 2027/2809; H01F 27/2804
USPC ........................................ 336/206, 200, 192
See application file for complete search history.

(56) References Cited

U.S. PATENT DOCUMENTS 8,441,334 B2 5/2013 Kawano
2016/0027578 A1* 1/2016 Nishino ................ H01F 41/041 335/297
2016/0049237 A1* 2/2016 Yosui .................. H01F 27/2804 336/200
2017/0316866 A1* 11/2017 Gouchi ............... H01F 17/0013
2018/0350507 A1* 12/2018 Matsubayashi ..... H01F 17/0013
2019/0228900 A1* 7/2019 Iida .......................... H05K 1/16
2021/0142938 A1* 5/2021 Matsuura ................ H01F 19/04

FOREIGN PATENT DOCUMENTS

JP 2011-082371 A 4/2011
JP 2011-159953 A 8/2011
JP 4946219 B2 6/2012
JP 2014022484 A * 2/2014
JP 2018-206897 A 12/2018
WO 2017/138241 A1 8/2017

* cited by examiner

*Primary Examiner* — Shawki S Ismail
*Assistant Examiner* — Kazi S Hossain
(74) *Attorney, Agent, or Firm* — Kim & Stewart LLP

(57) ABSTRACT

An insulating device includes: a first inductor including a first coil layer located in a first plane; a second inductor separated from the first inductor, the second inductor including a second coil layer located in the first plane, a central axis of the second coil layer being positioned inside the first coil layer; and an insulating layer located between the first inductor and the second inductor.

7 Claims, 9 Drawing Sheets

INSULATING DEVICE AND ISOLATOR

CROSS-REFERENCE TO RELATED APPLICATIONS

This application is based upon and claims the benefit of priority from the prior Japanese Patent Application No. 2021-153390, filed on Sep. 21, 2021; the entire contents of which are incorporated herein by reference.

FIELD

Embodiments relate to an insulating device and an isolator.

BACKGROUND

A magnetically coupled isolator utilizes a change of a magnetic field to transmit a signal or energy in a state in which the current is blocked.

DETAILED DESCRIPTION

Figure 1:
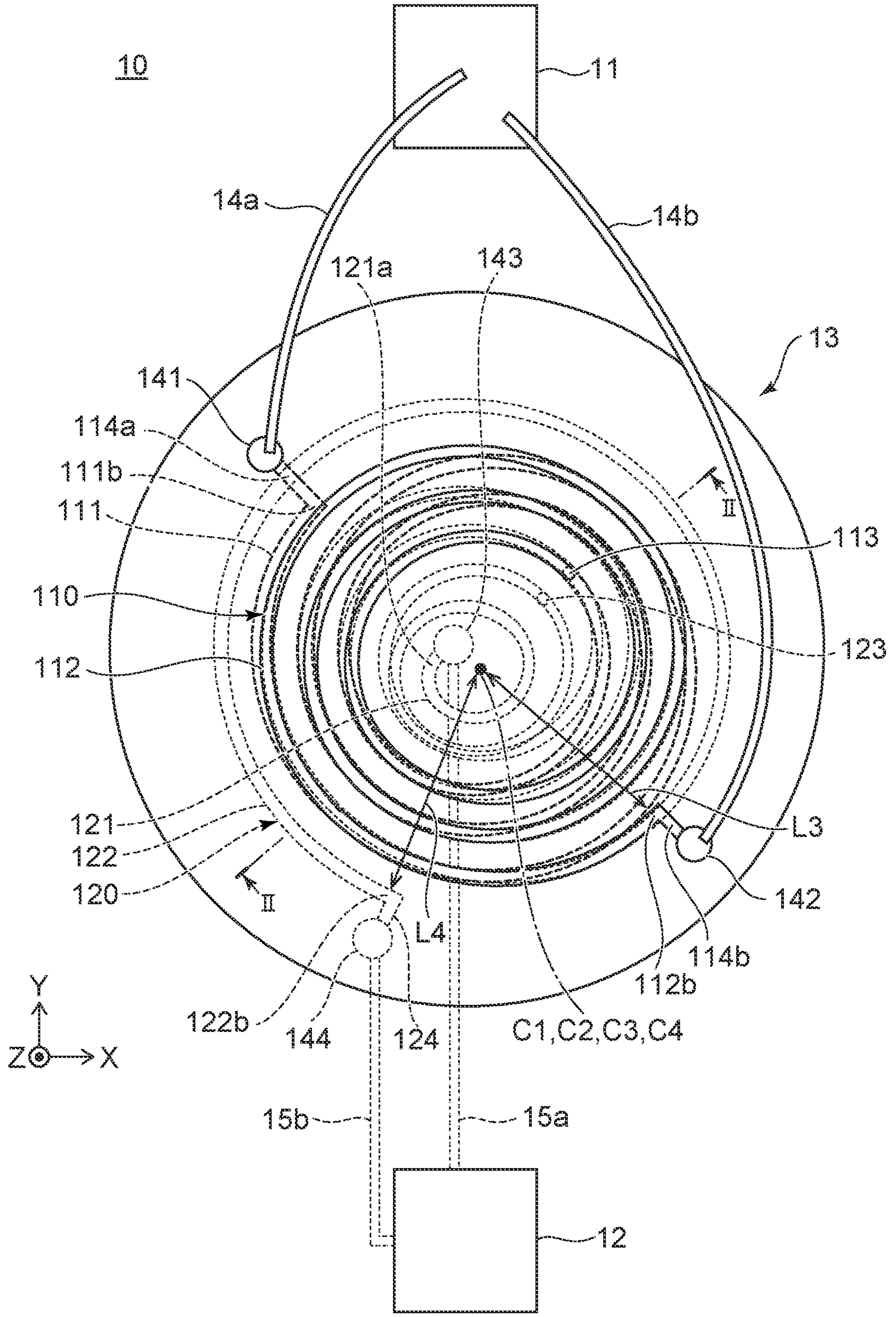
FIG. 1 is a top view showing an isolator according to a first embodiment.

According to one embodiment, an insulating device includes: a first inductor including a first coil layer located in a first plane; a second inductor separated from the first inductor, the second inductor including a second coil layer located in the first plane, a central axis of the second coil layer being positioned inside the first coil layer; and an insulating layer located between the first inductor and the second inductor.

According to one embodiment, an isolator includes: the insulating device; a first circuit electrically connected to the first inductor; and a second circuit electrically connected to the second inductor.

Various embodiments will be described hereinafter with reference to the accompanying drawings.

Exemplary embodiments will now be described with reference to the drawings.

The drawings are schematic or conceptual; and the relationships between the thickness and width of portions, the proportional coefficients of sizes among portions, etc., are not necessarily the same as the actual values thereof. Furthermore, the dimensions and proportional coefficients may be illustrated differently among drawings, even for identical portions.

In the specification of the application and the drawings, components similar to those described in regard to a drawing thereinabove are marked with like reference numerals, and a detailed description is omitted as appropriate.

An XYZ orthogonal coordinate system is used for easier understanding of the following description. The Z-direction in the direction of the arrow is taken as the "upward direction", and the opposite direction is taken as the "downward direction"; however, these directions are independent of the direction of gravity.

First Embodiment

First, a first embodiment will be described.

FIG. 1 is a top view showing an isolator according to the embodiment.

Figure 2:
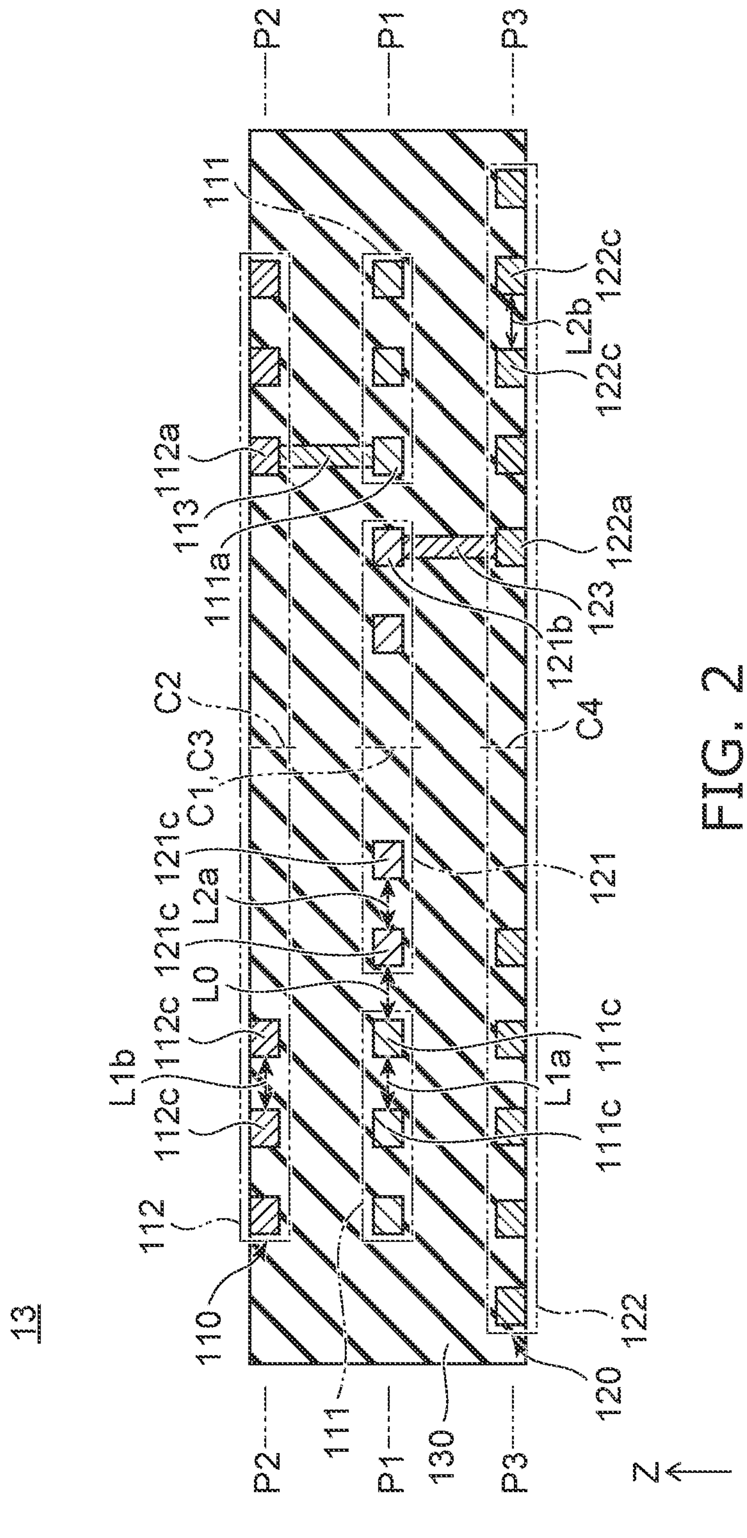
FIG. 2 is a cross-sectional view along line II-II of FIG. 1.

FIG. 2 is a cross-sectional view along line II-II of FIG. 1.

Figure 3A:
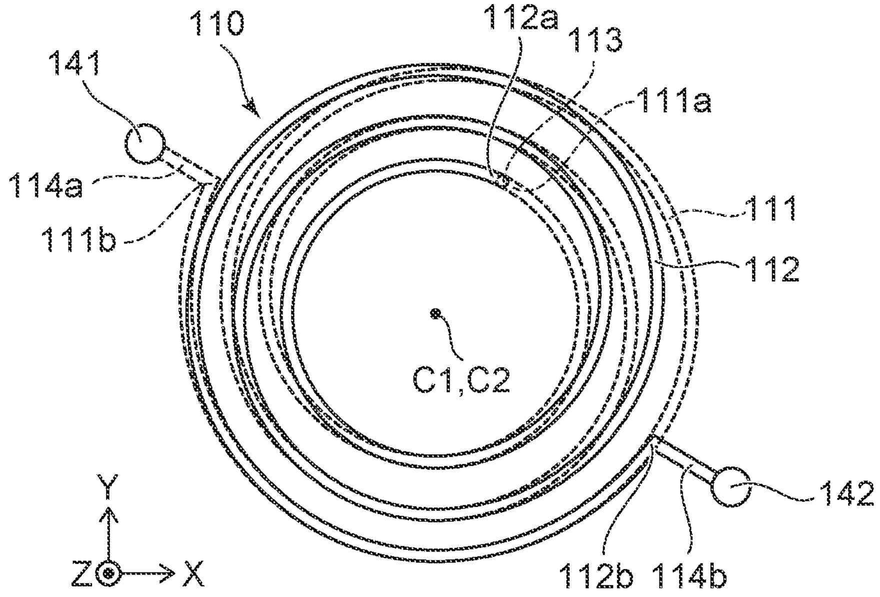
FIG. 3A is a top view showing a first inductor and connection members of the isolator according to the first embodiment.
Figure 3B:
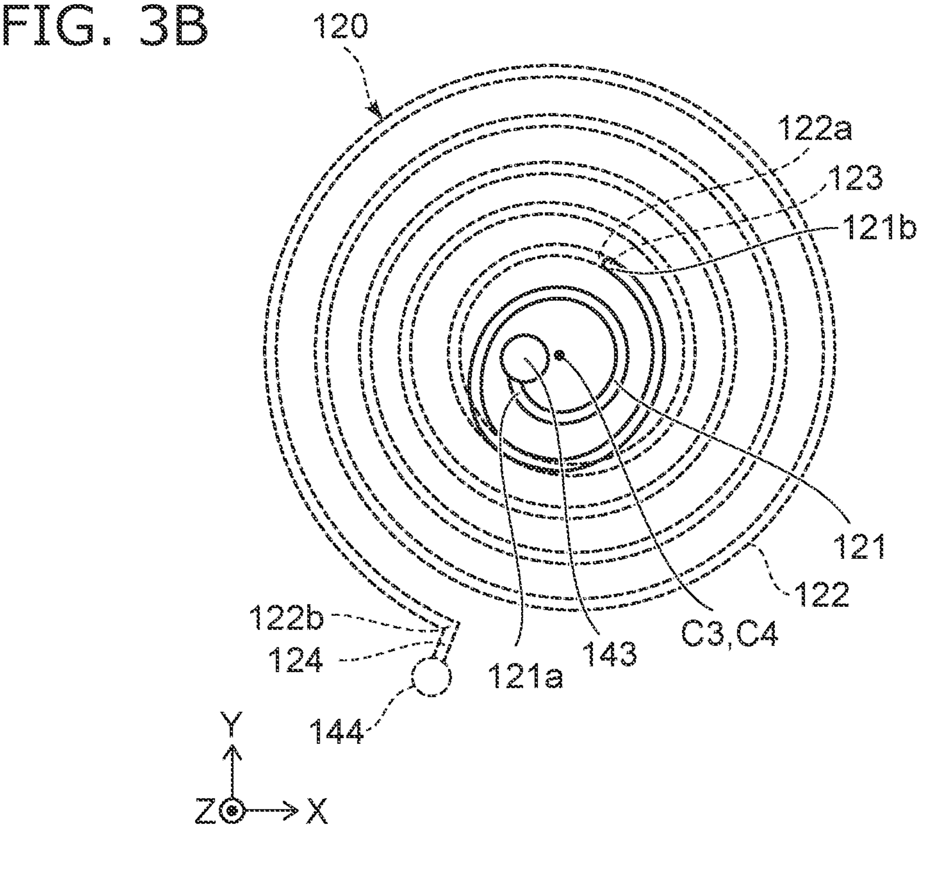
FIG. 3B is a top view showing a second inductor and connection members of the isolator according to the first embodiment.

FIG. 3A is a top view showing a first inductor and connection members of the isolator according to the embodiment; and FIG. 3B is a top view showing a second inductor and connection members of the isolator according to the embodiment.

The isolator 10 according to the embodiment is a magnetically coupled isolator. Generally speaking, as shown in FIG. 1, the isolator 10 includes a first circuit 11, a second circuit 12, an insulating device 13, and multiple wiring members 14*a*, 14*b*, 15*a*, and 15*b*.

Generally speaking, as shown in FIG. 2, the insulating device 13 includes the first inductor 110, the second inductor 120, and an insulating layer 130. The first circuit 11 is electrically connected to the first inductor 110. The second circuit 12 is electrically connected to the second inductor 120. Components of the isolator 10 will now be elaborated.

As shown in FIGS. 2 and 3A, the first inductor 110 includes a coil layer 111, a coil layer 112 positioned above the coil layer 111, a conductive member 113 that is positioned between the two coil layers 111 and 112 and is electrically connected to the two coil layers 111 and 112, and two extension portions 114*a* and 114*b*. For easier understanding of the description in FIG. 3A, the coil layer 112, the extension portion 114*b*, and connection members 141 and 142 that are described below are shown by solid lines; and the conductive member 113, the extension portion 114*a*, and the coil layer 111 that are positioned lower than the coil layer 112 are shown by broken lines.

As shown in FIG. 2, a central axis C1 of the coil layer 111 extends in the Z-direction; and the coil layer 111 is located in a plane P1 that is parallel to the X-Y plane. Accordingly, the Z-direction corresponds to an axis direction in which the central axis C1 extends. For example, the coil layer 111 has a spiral shape in which the number of turns is not less than 1. The shape of the coil layer as an entirety may be substantially polygonal such as substantially quadrilateral, substantially hexagonal, etc. This is similar for the other coil layers described below as well. The upper surface and the lower surface of the coil layer 111 are, for example, flat surfaces that are substantially parallel to the X-Y plane.

A central axis C2 of the coil layer 112 extends in the Z-direction; and the coil layer 112 is located in a plane P2 that is parallel to the X-Y plane. The plane P2 is separated from the plane P1 in the Z-direction and is positioned, for example, higher than the plane P1. The central axis C2 is positioned inside the coil layer 111 when viewed along the Z-direction. Specifically, the central axis C1 and the central axis C2 are positioned at substantially the same position when viewed along the Z-direction. However, the central axis C2 and the central axis C1 may be positioned at different positions when viewed along the Z-direction. For example, the coil layer 112 has a spiral shape in which the number of turns is not less than 1. The upper surface and the lower surface of the coil layer 112 are, for example, flat surfaces that are substantially parallel to the X-Y plane.

The extension portion 114*a* is connected to an outer end portion 111*b* of the coil layer 111. The extension portion 114*a* extends outward from the outer end portion 111*b* in the diametrical direction of the coil layer 111. The connection member 141 is conductive and is connected to the outer end portion of the extension portion 114*a*. The connection member 141 extends upward from the outer end portion of the extension portion 114*a* and is connected to the wiring member 14*a* as shown in FIG. 1. The wiring member 14*a* passes over the insulating device 13 and is electrically connected to the first circuit 11. However, the outer end portion 111*b* may be electrically connected to the first circuit 11 by a wiring member (not illustrated) that passes below the insulating device 13. In such a case, a connection member (not illustrated) that extends downward from the outer end portion 111*b* and is connected to the wiring member may be included in the insulating device 13.

As shown in FIG. 3A, an inner end portion 111*a* of the coil layer 111 and an inner end portion 112*a* of the coil layer 112 overlap when viewed along the Z-direction.

As shown in FIG. 2, the conductive member 113 is positioned between the inner end portion 111*a* of the coil layer 111 and the inner end portion 112*a* of the coil layer 112 and is connected to the inner end portions 111*a* and 112*a*. Thereby, the coil layer 112 is electrically connected to the coil layer 111. The conductive member 113 is, for example, columnar and extends in the Z-direction.

As shown in FIG. 3A, the extension portion 114*b* is connected to an outer end portion 112*b* of the coil layer 112. The extension portion 114*b* extends outward from the outer end portion 112*b* in the diametrical direction of the coil layer 112. The connection member 142 is conductive and is connected to the outer end portion of the extension portion 114*b*. As shown in FIG. 1, the connection member 142 is connected to the wiring member 14*b*. The wiring member 14*b* passes over the insulating device 13 and is connected to the first circuit 11. However, the outer end portion 112*b* may be electrically connected to the first circuit 11 by a wiring member (not illustrated) that passes below the insulating device 13. In such a case, a connection member (not illustrated) that extends downward from the outer end portion 112*b* and is connected to the wiring member may be included in the insulating device 13.

Thus, in the first inductor 110 as shown in FIG. 3A, a current flows from the outer end portion 111*b* of the coil layer 111 toward the outer end portion 112*b* of the coil layer 112 or from the outer end portion 112*b* of the coil layer 112 toward the outer end portion 111*b* of the coil layer 111. The turn direction of the coil layer 111 and the turn direction of the coil layer 112 match in the current path of the first inductor 110. In other words, the orientation of the magnetic field generated in the interior of the coil layer 111 and the orientation of the magnetic field generated in the interior of the coil layer 112 match when the current flows in the first inductor 110.

As shown in FIG. 3A, the coil layer 111 and the coil layer 112 partially overlap at multiple locations other than where the conductive member 113 is located when viewed along the Z-direction.

Thus, a series of coils consists of the coil layer 111, the coil layer 112, and the conductive member 113. However, the configuration of the first inductor is not limited to the configuration described above. For example, the number of coil layers included in the first inductor may be three or more. As long as a series of coils can be formed of multiple coil layers, the connection positions between coil layers adjacent to each other in the Z-direction, etc., are not limited to those described above. The positions at which the connection members are connected in the first inductor are not limited to those described above.

The second inductor 120 is separated from the first inductor 110. As shown in FIGS. 2 and 3B, the second inductor 120 includes a coil layer 121, a coil layer 122 positioned below the coil layer 121, a conductive member 123 electrically connected to the two coil layers 121 and 122, and an extension portion 124. For easier understanding of the description in FIG. 3B, the coil layer 121 and a connection member 143 that is described below are shown by solid lines; and a connection member 144 that is described below, the extension portion 124, the conductive member 123, and the coil layer 122 that are positioned lower than the coil layer 121 are shown by broken lines.

As shown in FIG. 2, a central axis C3 of the coil layer 121 extends in the Z-direction; and the coil layer 121 is located in the plane P1. In other words, the coil layer 111 and the coil layer 121 are positioned in the same plane P1. The central axis C3 of the coil layer 121 is positioned inside the coil layer 111. Specifically, according to the embodiment, the central axis C3 of the coil layer 121 is substantially aligned with the central axis C1. However, the central axis C3 and the central axis C1 may not be aligned. For example, the coil layer 121 is positioned inside the coil layer 111. For example, the coil layer 121 has a spiral shape in which the number of turns is not less than 1. The upper surface and the lower surface of the coil layer 121 are, for example, flat surfaces that are substantially parallel to the X-Y plane.

A central axis C4 of the coil layer 122 extends in the Z-direction; and the coil layer 122 is located in a plane P3 that is parallel to the X-Y plane. The plane P3 is separated from the plane P1 in the Z-direction and is positioned below the plane P1. Accordingly, the plane P1 is positioned between the plane P3 and the plane P2. For example, the coil layer 122 has a spiral shape in which the number of turns is not less than 1. The central axis C4 is positioned inside the coil layer 111 when viewed along the Z-direction. Specifically, the central axis C4 and the central axis C3 are positioned at substantially the same position when viewed along the Z-direction. However, the central axis C3 and the central axis C4 may be positioned at different positions when viewed along the Z-direction. The greater part of the coil layer 121 is positioned inside the coil layer 122 when viewed along the Z-direction.

For example, the connection member 143 is conductive and is connected to an inner end portion 121*a* of the coil layer 121. The connection member 143 extends downward from the inner end portion 121*a* and is connected to the wiring member 15*a* as shown in FIG. 1. The wiring member 15*a* passes below the insulating device 13 and is connected to the second circuit 12. However, the inner end portion 121*a* may be electrically connected to the second circuit 12 by a wiring member (not illustrated) that passes over the insulating device 13. In such a case, a connection member (not illustrated) that extends upward from the inner end portion 121*a* and is connected to the wiring member may be included in the insulating device 13.

As shown in FIG. 3B, an outer end portion 121*b* of the coil layer 121 and an inner end portion 122*a* of the coil layer 122 overlap when viewed along the Z-direction.

As shown in FIG. 2, the conductive member 123 is positioned between the outer end portion 121*b* of the coil layer 121 and the inner end portion 122*a* of the coil layer 122 and is connected to the outer end portion 121*b* and the inner end portion 122*a*. Thereby, the coil layer 122 is electrically connected to the coil layer 121. The conductive member 123 is, for example, columnar and extends in the Z-direction.

As shown in FIG. 3B, the extension portion 124 is connected to an outer end portion 122*b* of the coil layer 122. The extension portion 124 extends outward from the outer end portion 122*b* in the diametrical direction of the coil layer 122. The connection member 144 is conductive and is connected to the outer end portion of the extension portion 124. For example, as shown in FIG. 1, the connection member 144 is connected to the wiring member 15*b*. The wiring member 15*b* passes below the insulating device 13 and is connected to the second circuit 12. However, when the connection member 143 extends upward and is connected to the wiring member 15*a,* the connection member 144 also extends upward and is connected to the wiring member 15*b*.

Accordingly, as shown in FIG. 3B, a current flows in the second inductor 120 from the inner end portion 121*a* of the coil layer 121 toward the outer end portion 122*b* of the coil layer 122 or from the outer end portion 122*b* of the coil layer 122 toward the inner end portion 121*a* of the coil layer 121. The turn direction of the coil layer 121 and the turn direction of the coil layer 122 match in the current path of the second inductor 120. In other words, the orientation of the magnetic field generated in the interior of the coil layer 121 and the orientation of the magnetic field generated in the interior of the coil layer 122 match when the current flows in the second inductor 120.

The coil layer 121 and the coil layer 122 partially overlap at locations other than where the conductive member 123 is located when viewed along the Z-direction. However, the coil layer 121 and the coil layer 122 may not overlap at locations other than where the conductive member is located when viewed along the Z-direction.

As described above, a series of coils is formed of the coil layer 121, the coil layer 122, and the conductive member 123. However, the configuration of the second inductor is not limited to the configuration described above. For example, the number of coil layers included in the second inductor may be three or more. As long as a series of coils can be formed of multiple coil layers, the connection positions between the adjacent coil layers, etc., are not limited to those described above. The positions at which the connection members are connected in the second inductor are not limited to those described above. Multiple sets of coil layers of the first inductor and coil layers of the second inductor may exist in the same plane. The first circuit or the second circuit may be mounted to a substrate located below the insulating layer.

As shown in FIG. 2, a distance L0 between the coil layer 111 and the coil layer 121 is less than the distance between the coil layer 111 and the coil layer 112 in the Z-direction and the distance between the coil layer 121 and the coil layer 122 in the Z-direction. According to the embodiment, the distance L0 is substantially equal to a distance L1*a* between two adjacent portions 111*c* of the coil layer 111 in a cross section that includes the central axis C1 and is parallel to the central axis C1. Also, according to the embodiment, the distance L0 is substantially equal to a distance L2*a* between two adjacent portions 121*c* of the coil layer 121 in a cross section that includes the central axis C3 and is parallel to the central axis C3. According to the embodiment, the distance L0 is substantially equal to a distance L1*b* between two adjacent portions 112*c* of the coil layer 112 in a cross section that includes the central axis C2 and is parallel to the central axis C2. The distance L0 is substantially equal to a distance L2*b* between two adjacent portions 122*c* of the coil layer 122 in a cross section that includes the central axis C4 and is parallel to the central axis C4. However, these distances may be different from each other.

As shown in FIG. 1, a distance L4 between the central axis C4 and the outer end portion 122*b* of the coil layer 122 is greater than a distance L3 between the central axis C2 and the outer end portion 112*b* of the coil layer 112. In other words, a portion of the coil layer 122 surrounds the coil layer 112 when viewed along the Z-direction. However, the magnitude relationship of these distances is not limited to the magnitude relationship described above.

The first inductor 110, the second inductor 120, and the connection members 141, 142, 143, and 144 include metal materials such as copper, aluminum, etc. The surfaces of the first inductor 110, the second inductor 120, and the connection members 141, 142, 143, and 144 may be covered with a metal material such as tantalum, etc.

The first inductor 110, the second inductor 120, and the connection members 141, 142, 143, and 144 are located in the insulating layer 130. Specifically, as shown in FIG. 2, the insulating layer 130 is located between the two adjacent portions 111*c* of the coil layer 111, between the coil layer 111 and the coil layer 112, and between the two adjacent portions 112*c* of the coil layer 112. The insulating layer 130 also is located between the two adjacent portions 121*c* of the coil layer 121, between the coil layer 121 and the coil layer 122, and between the two adjacent portions 122*c* of the coil layer 122. The insulating layer 130 also is located between the coil layer 111 and the coil layer 121.

The insulating layer 130 includes an insulating material such as a resin such as polyimide, bismaleimide triazine (BT), or the like, silicon oxide, silicon nitride, etc.

The configuration of the insulating device is not limited to the configuration described above. For example, a protective layer also may be located at the upper surface or the lower surface of the insulating layer.

One of the first circuit 11 or the second circuit 12 is used as a receiving circuit. The other of the first circuit 11 or the second circuit 12 is used as a transmitting circuit. In the following description, the first circuit 11 is a transmitting circuit, and the second circuit 12 is a receiving circuit.

The first circuit 11 causes a current to flow in the first inductor 110. A magnetic field that passes through the interior of the first inductor 110 is generated when the current flows through the first inductor 110. The central axis C3 of the coil layer 121 of the second inductor 120 is positioned inside the coil layer 111 of the first inductor 110. Therefore, a portion of the generated magnetic force line passes through the interior of the second inductor 120. An induced electromotive force is generated in the second inductor 120 by the change of the magnetic field in the interior of the second inductor 120; and a current flows in the second inductor 120. Thereby, a current is caused to flow in the second circuit 12 connected to the second inductor 120. Thus, the signal or electrical power is transmitted in the state in which the current is blocked (insulated) between the first inductor 110 and the second inductor 120.

Effects of the first embodiment will now be described.

In the insulating device 13 according to the embodiment, the coil layer 121 of the second inductor 120 and the coil layer 111 of the first inductor 110 are located in the same plane P1. Thereby, compared to the case where the first inductor and the second inductor are separated in the Z-direction, the first inductor 110 and the second inductor 120 can approach each other in the Z-direction; therefore, a coupling coefficient k of the first and second inductors 110 and 120 can be increased.

The first inductor 110 includes the multiple coil layers 111 and 112. Therefore, the number of turns of the first inductor 110 can be greater than when the first inductor is a single layer. The inductance of the first inductor 110 is increased by increasing the number of turns of the first inductor 110. The Q-factor of the insulating device 13 can be increased thereby.

By increasing the Q-factor and the coupling coefficient k as described above, the kQ product that is the product of the coupling coefficient k and the Q-factor can be increased. Therefore, the transmission efficiency of the signal or energy between the first inductor 110 and the second inductor 120 can be increased.

For example, the coil layer 111 and the coil layer 121 can be formed by one mask because the coil layer 111 and the coil layer 121 are positioned in the same plane P1. Therefore, the distance L0 between the coil layer 111 and the coil layer 121 is easily controlled when manufacturing. Accordingly, fluctuation of the coupling coefficient k between the multiple insulating devices 13 can be suppressed when manufacturing the insulating devices 13. Also, the manufacture of the insulating device 13 is easier.

The coil layer 111 and the coil layer 112 partially overlap when viewed along the Z-direction. Therefore, an increase of the size of the first inductor 110 when viewed along the Z-direction can be suppressed while increasing the number of turns of the first inductor 110.

The second inductor 120 further includes the coil layer 122. The coil layer 122 is located in the plane P3. The plane P3 is separated from the plane P1 in the Z-direction. The plane P1 is positioned between the plane P3 and the plane P2. Therefore, the number of turns of the second inductor 120 can be greater than when the second inductor is a single layer. The inductance of the second inductor 120 is increased by increasing the number of turns of the second inductor 120. The Q-factor of the insulating device 13 can be increased thereby.

The coil layer 121 is positioned inside the coil layer 111. The distance L4 between the outer end portion 122*b* of the coil layer 122 and the central axis C4 of the coil layer 122 is greater than the distance L3 between the outer end portion 112*b* of the coil layer 112 and the central axis C2 of the coil layer 112. Therefore, the inductance of the coil layer 122 can be improved even when the inductance of the coil layer 121 is reduced by disposing the coil layer 121 inside the coil layer 111. A reduction of the inductance of the entire second inductor 120 can be suppressed thereby.

Second Embodiment

A second embodiment will now be described.

Figure 4:
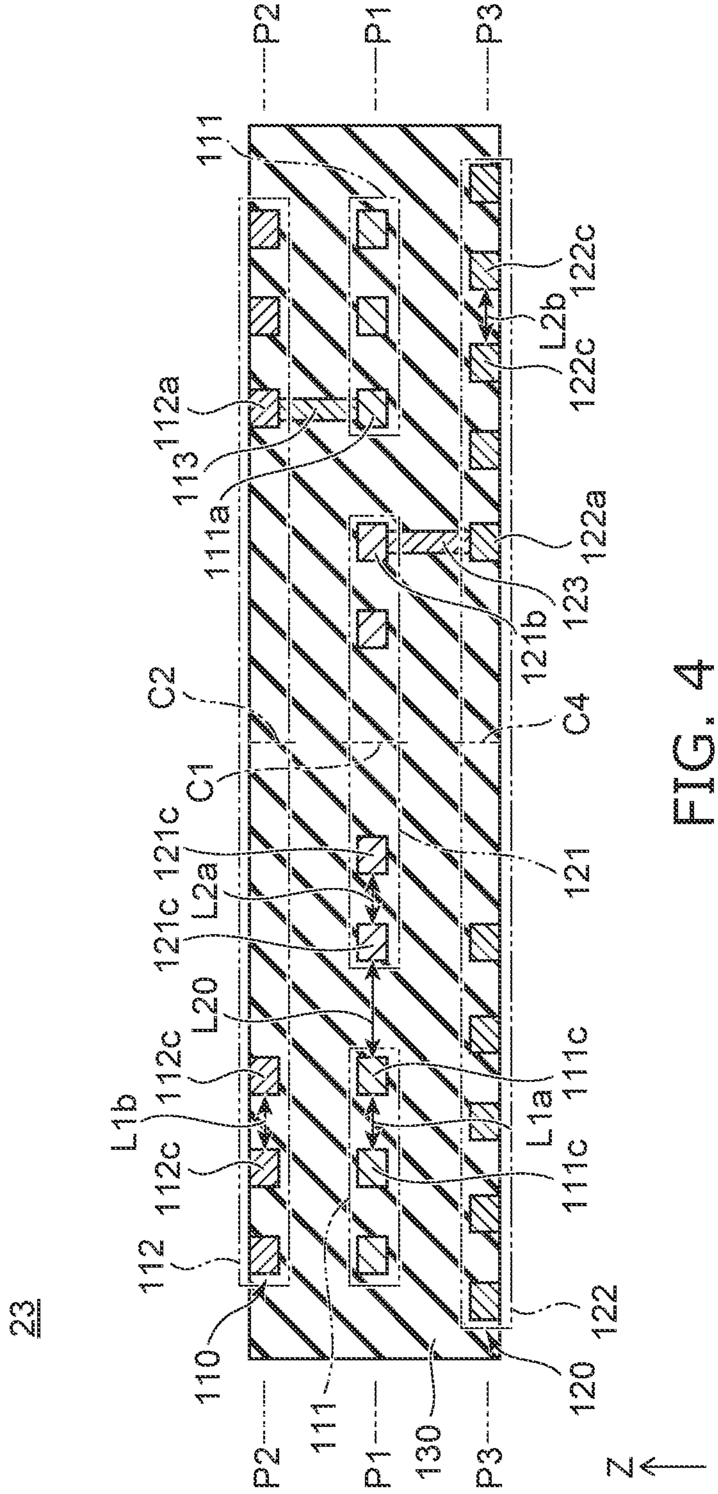
FIG. 4 is a cross-sectional view showing a portion of an insulating device according to a second embodiment.

FIG. 4 is a cross-sectional view showing a portion of an insulating device according to the embodiment.

As a general rule in the following description, only the differences from the first embodiment are described. Other than the items described below, the embodiment is similar to the first embodiment. This is similar for the other embodiments described below as well.

In the insulating device 23 according to the embodiment, a distance L20 between the coil layer 111 and the coil layer 121 is greater than a distance L1*a* between the two adjacent portions 111*c* of the coil layer 111. The distance L20 is greater than the distance L2*a* between the two adjacent portions 121*c* of the coil layer 121. The distance L20 is greater than the distance L1*b* between the two adjacent portions 112*c* of the coil layer 112. The distance L20 is greater than the distance L2*b* between the two adjacent portions 122*c* of the coil layer 122.

In the insulating device 23 according to the embodiment as described above, the distance L20 between the coil layer 111 and the coil layer 121 is greater than the distance L1*b* between the two adjacent portions 112*c* of the coil layer 112. The breakdown voltage of the insulating device 23 can be increased thereby. Also, the degradation of the insulating device 23 can be suppressed.

The distance L20 between the coil layer 111 and the coil layer 121 is greater than the length in the Z-direction of the conductive member 113 and the length in the Z-direction of the conductive member 123. The breakdown voltage in the lateral direction of the insulating device 23 can be increased thereby. Also, the degradation of the insulating device 23 can be suppressed.

Third Embodiment

A third embodiment will now be described.

Figure 5:
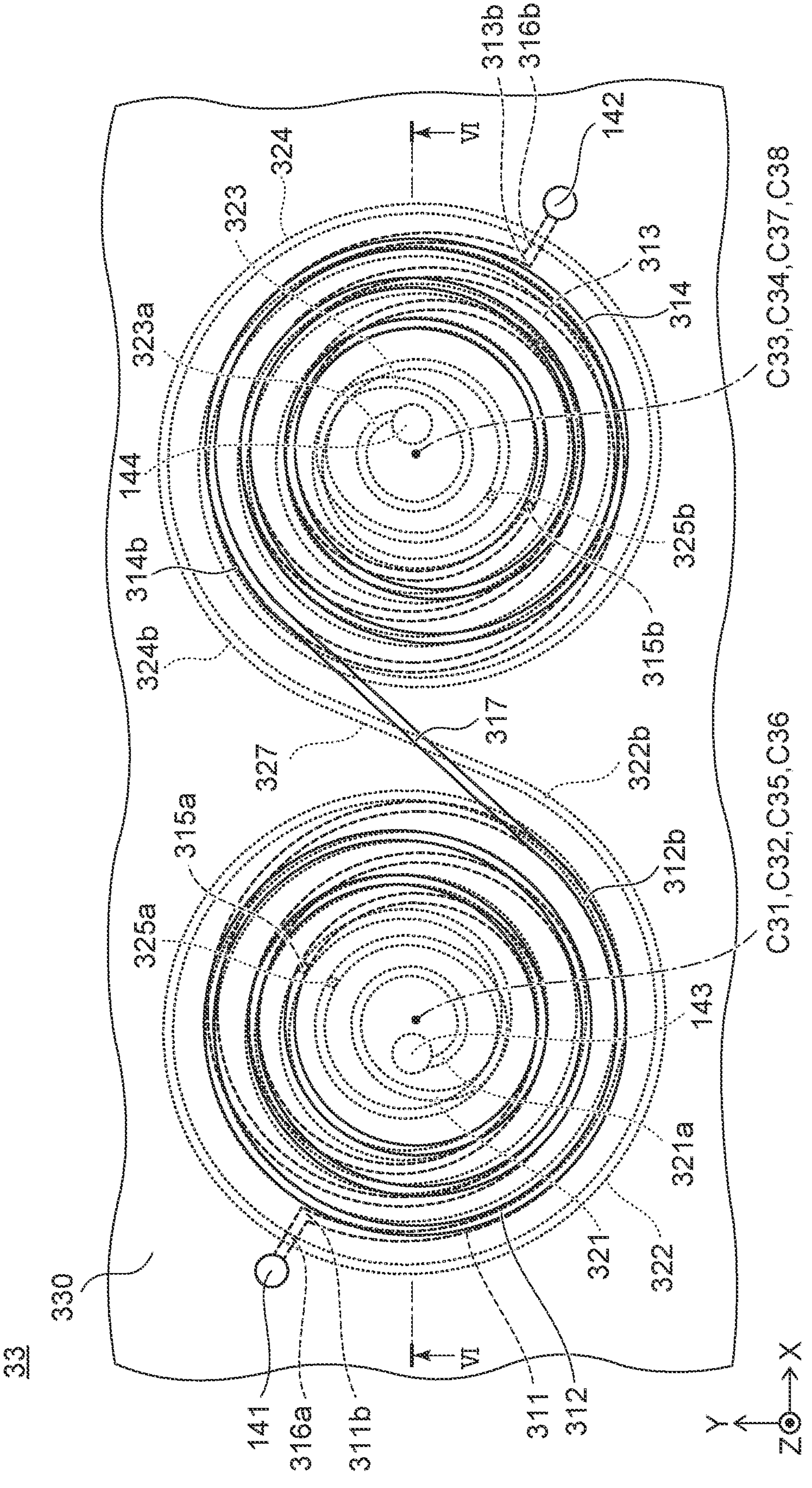
FIG. 5 is a top view showing a portion of an insulating device according to a third embodiment.

FIG. 5 is a top view showing a portion of an insulating device according to the embodiment.

Figure 6:
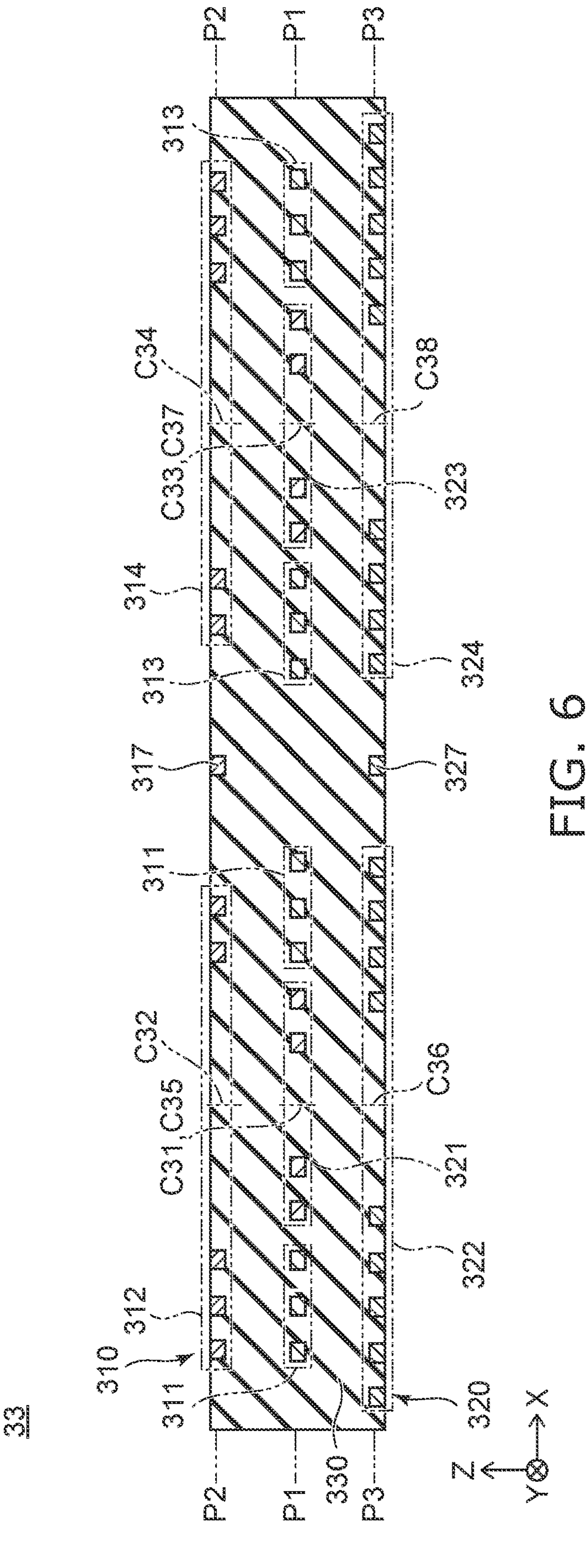
FIG. 6 is a cross-sectional view along line VI-VI of FIG. 5.

FIG. 6 is a cross-sectional view along line VI-VI of FIG. 5.

Figure 7A:
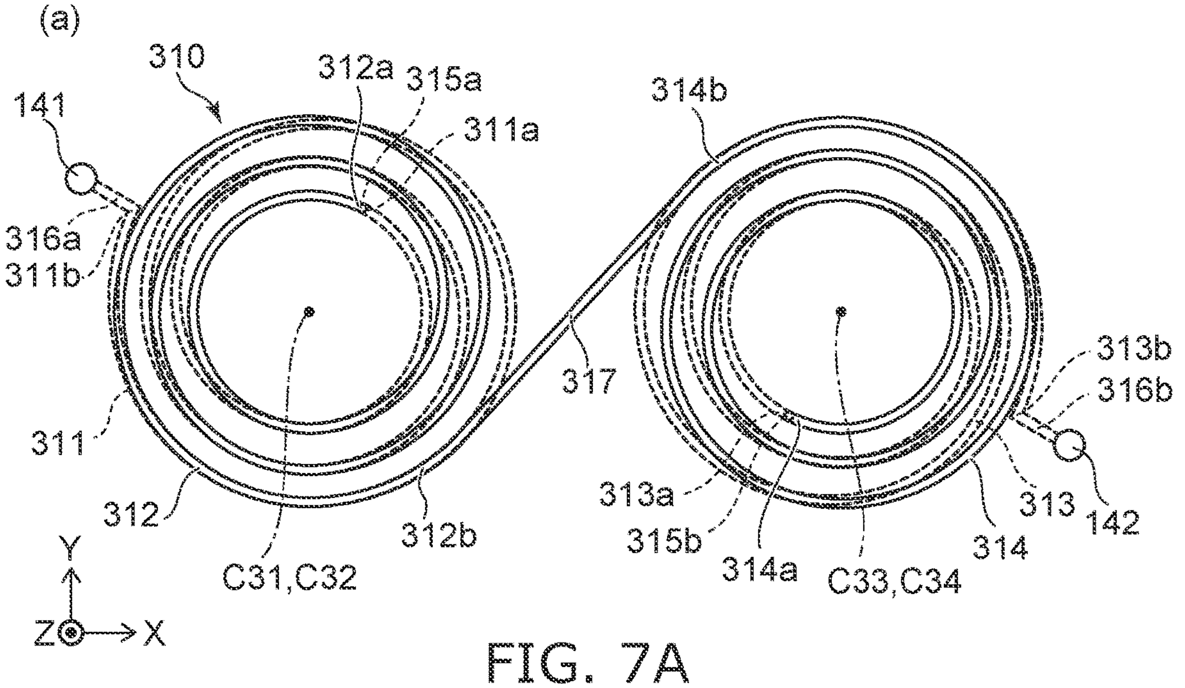
FIG. 7A shows a first inductor and connection members of the insulating device according to the third embodiment.
Figure 7B:
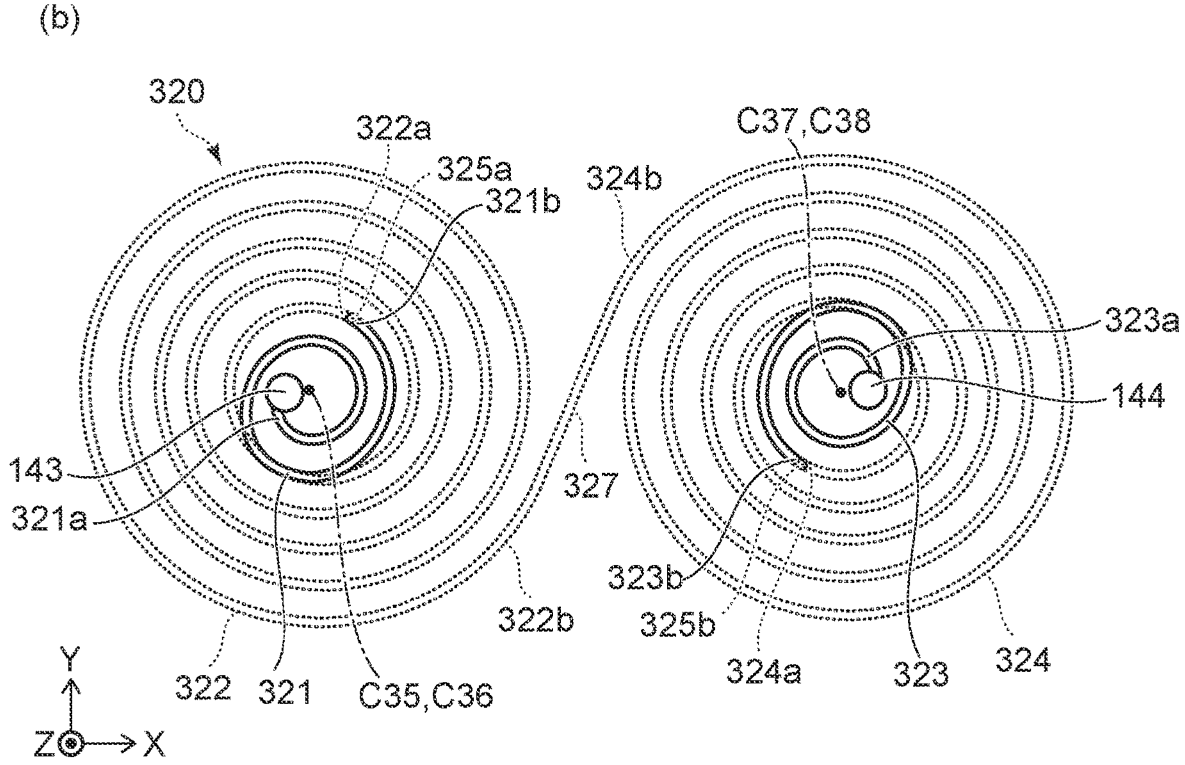
FIG. 7B shows a second inductor and connection members of the insulating device according to the third embodiment.

FIG. 7A shows a first inductor and connection members of the insulating device according to the embodiment; and FIG. 7B shows a second inductor and connection members of the insulating device according to the embodiment.

As shown in FIGS. 6 and 7A, the first inductor 310 of the insulating device 33 according to the embodiment includes four coil layers 311, 312, 313, and 314, two conductive members 315*a* and 315*b*, two extension portions 316*a* and 316*b*, and a connection portion 317. In FIG. 7A, the coil layer 312, the coil layer 314, the connection portion 317, and the two connection members 141 and 142 are shown by solid lines; and the two extension portions 316*a* and 316*b*, the two conductive members 315*a* and 315*b*, the coil layer 313, and the coil layer 311 that are positioned lower than the coil layers 312 and 314 are shown by broken lines.

As shown in FIG. 6, a central axis C31 of the coil layer 311 and a central axis C33 of the coil layer 313 extend in the Z-direction; and the coil layer 311 and the coil layer 313 are located in the plane P1. The coil layer 311 and the coil layer 313 are arranged in the X-direction. The coil layer 311 has a spiral shape in which the number of turns is not less than 1. For example, the coil layer 311 and the coil layer 313 have a point-symmetric relationship with the midpoint between the central axis C31 and the central axis C33 as the center.

A central axis C32 of the coil layer 312 and a central axis C34 of the coil layer 314 extend in the Z-direction; and the coil layer 312 and the coil layer 314 are located in the plane P2. The coil layer 312 is positioned above the coil layer 311. The coil layer 314 is positioned above the coil layer 313. The central axis C32 of the coil layer 312 is positioned inside the coil layer 311 when viewed along the Z-direction. The central axis C34 of the coil layer 314 is positioned inside the coil layer 313 when viewed along the Z-direction. The coil layer 312 and the coil layer 314 are arranged in the X-direction. The coil layer 312 has a spiral shape in which the number of turns is not less than 1. For example, the coil layer 312 and the coil layer 314 have a point-symmetric relationship with the midpoint between the central axis C32 and the central axis C34 as the center.

As shown in FIG. 7A, the extension portion 316*a* is connected to an outer end portion 311*b* of the coil layer 311. The connection member 141 is connected to the outer end portion of the extension portion 316*a*. For example, the connection member 141 extends upward from the outer end portion of the extension portion 316*a*. The upper end portion of the connection member 141 is connected to a wiring member (not illustrated) that passes over the insulating device 33, and is electrically connected to the first circuit via the wiring member. However, the connection member 141 may extend downward and may be connected to a wiring member (not illustrated) that passes below the insulating device 33.

An inner end portion 311*a* of the coil layer 311 overlaps an inner end portion 312*a* of the coil layer 312 when viewed along the Z-direction. The conductive member 315*a* is positioned between the inner end portion 311*a* and the inner end portion 312*a*. The conductive member 315*a* is connected to the inner end portions 311*a* and 312*a*.

The extension portion 316*b* is connected to an outer end portion 313*b* of the coil layer 313. The connection member 142 is connected to the outer end portion of the extension portion 316*b*. For example, the connection member 142 extends upward from the outer end portion of the extension portion 316*b*. The upper end portion of the connection member 142 is connected to a wiring member (not illustrated) that passes over the insulating device 33, and is electrically connected to the first circuit via the wiring member. However, the connection member 142 may extend downward and may be connected to a wiring member (not illustrated) that passes below the insulating device 33.

An inner end portion 313*a* of the coil layer 313 overlaps an inner end portion 314*a* of the coil layer 314 when viewed along the Z-direction. The conductive member 315*b* is positioned between the inner end portion 313*a* and the inner end portion 314*a*. The conductive member 315*b* is connected to the inner end portions 313*a* and 314*a*.

The connection portion 317 that is linear is positioned between an outer end portion 312*b* of the coil layer 312 and an outer end portion 314*b* of the coil layer 314. The connection portion 317 is connected to the outer end portions 312*b* and 314*b*. However, the connection portion may not be linear, and may be curved. This is similar for the other connection portions described below as well.

Accordingly, in the first inductor 310, a current flows from the outer end portion 311*b* of the coil layer 311 toward the outer end portion 313*b* of the coil layer 313 or from the outer end portion 313*b* of the coil layer 313 toward the outer end portion 311*b* of the coil layer 311. In the current path of the first inductor 310, the turn direction of the coil layer 311 and the turn direction of the coil layer 312 match, and the turn direction of the coil layer 313 and the turn direction of the coil layer 314 match. Therefore, when the current flows in the first inductor 310, the orientation of the magnetic field generated in the interior of the coil layer 311 and the orientation of the magnetic field generated in the interior of the coil layer 312 match, and the orientation of the magnetic field generated in the interior of the coil layer 313 and the orientation of the magnetic field generated in the interior of the coil layer 314 match. In the current path of the first inductor 310, the turn directions of the coil layers 311 and 312 are opposite to the turn direction of the coil layers 313 and 314. Therefore, when the current flows in the first inductor 310, the orientation of the magnetic field generated in the interiors of the coil layers 311 and 312 is opposite to the orientation of the magnetic field generated in the interiors of the coil layers 313 and 314.

As shown in FIGS. 6 and 7B, a second inductor 320 includes four coil layers 321, 322, 323, and 324, two conductive members 325*a* and 325*b*, and a connection portion 327. In FIG. 7B, the coil layer 321, the coil layer 323, and the two connection members 143 and 144 are shown by solid lines, and the two conductive members 325*a* and 325*b*, the coil layer 324, and the coil layer 322 that are positioned lower than the coil layers 321 and 323 are shown by broken lines.

A central axis C35 of the coil layer 321 is substantially aligned with the central axis C31 of the coil layer 311. A central axis C37 of the coil layer 323 is substantially aligned with the central axis C33 of the coil layer 313. The coil layer 321 and the coil layer 323 are located in the plane P1. For example, the coil layer 321 is positioned inside the coil layer 311. For example, the coil layer 323 is positioned inside the coil layer 313. The coil layer 321 has a spiral shape in which the number of turns is not less than 1. For example, the coil layer 321 and the coil layer 323 have a point-symmetric relationship with the midpoint between the central axis C35 and the central axis C37 as the center.

A central axis C36 of the coil layer 322 and a central axis C38 of the coil layer 324 extend in the Z-direction; and the coil layer 322 and the coil layer 324 are located in the plane P3. The coil layer 322 is positioned below the coil layer 321. The coil layer 324 is positioned below the coil layer 323. The central axis C36 of the coil layer 322 is positioned inside the coil layer 321 when viewed along the Z-direction. The central axis C38 of the coil layer 324 is positioned inside the coil layer 323 when viewed along the Z-direction. The coil layer 322 and the coil layer 324 are arranged in the X-direction. The coil layer 322 has a spiral shape in which the number of turns is not less than 1. For example, the coil layer 322 and the coil layer 324 have a point-symmetric relationship with the midpoint between the central axis C36 and the central axis C38 as the center.

As shown in FIG. 7B, the connection member 143 is connected to an inner end portion 321*a* of the coil layer 321. For example, the connection member 143 extends downward from the inner end portion 321*a*. The lower end portion of the connection member 143 is connected to a wiring member (not illustrated) that passes below the insulating device 33, and is electrically connected to the second circuit via the wiring member. However, the connection member 143 may extend upward and may be connected to a wiring member (not illustrated) that passes over the insulating device 33.

An outer end portion 321*b* of the coil layer 321 overlaps an inner end portion 322*a* of the coil layer 322 when viewed along the Z-direction. The conductive member 325*a* is positioned between the outer end portion 321*b* and the inner end portion 322*a*. The conductive member 325*a* is connected to the outer end portion 321*b* and the inner end portion 322*a*.

The connection member 144 is connected to an inner end portion 323*a* of the coil layer 323. For example, the connection member 144 extends downward from the inner end portion 323*a*. The lower end portion of the connection member 144 is connected to a wiring member (not illustrated) that passes below the insulating device 33, and is electrically connected to the second circuit via the wiring member. However, the connection member 144 may extend upward and may be connected to a wiring member (not illustrated) that passes over the insulating device 33.

An outer end portion 323*b* of the coil layer 323 overlaps an inner end portion 324*a* of the coil layer 324 when viewed along the Z-direction. The conductive member 325*b* is positioned between the outer end portion 323*b* and the inner end portion 324*a*. The conductive member 325*b* is connected to the outer end portion 323*b* and the inner end portion 324*a*.

The connection portion 327 that is linear is positioned between an outer end portion 322*b* of the coil layer 322 and an outer end portion 324*b* of the coil layer 324. The connection portion 327 is connected to the outer end portions 322*b* and 324*b*.

Accordingly, in the second inductor 320, a current flows from the inner end portion 321*a* of the coil layer 321 toward the inner end portion 323*a* of the coil layer 323 or from the inner end portion 323*a* of the coil layer 323 toward the inner end portion 321*a* of the coil layer 321. In the current path of the second inductor 320, the turn direction of the coil layer 321 and the turn direction of the coil layer 322 match, and the turn direction of the coil layer 323 and the turn direction of the coil layer 324 match. Therefore, when the current flows in the second inductor 320, the orientation of the magnetic field generated in the interior of the coil layer 321 and the orientation of the magnetic field generated in the interior of the coil layer 322 match, and the orientation of the magnetic field generated in the interior of the coil layer 323 and the orientation of the magnetic field generated in the interior of the coil layer 324 match. Also, in the current path of the second inductor 320, the turn directions of the coil layers 321 and 322 are opposite to the turn direction of the coil layers 323 and 324. Therefore, when the current flows in the second inductor 320, the orientation of the magnetic field generated in the interiors of the coil layers 321 and 322 is opposite to the orientation of the magnetic field generated in the interiors of the coil layers 323 and 324.

The first inductor 310, the second inductor 320, and the connection members 141, 142, 143, and 144 are located in an insulating layer 330.

As described above, the first inductor 310 may further include the coil layer 313 that is located in the same plane P1 as the coil layer 311, and the coil layer 314 that is located in the same plane P2 as the coil layer 312. Also, the second inductor 320 may further include the coil layer 323 that is located in the same plane P1 as the coil layer 321, and the coil layer 324 that is located in the same plane P3 as the coil layer 322.

Fourth Embodiment

A fourth embodiment will now be described.

Figure 8:
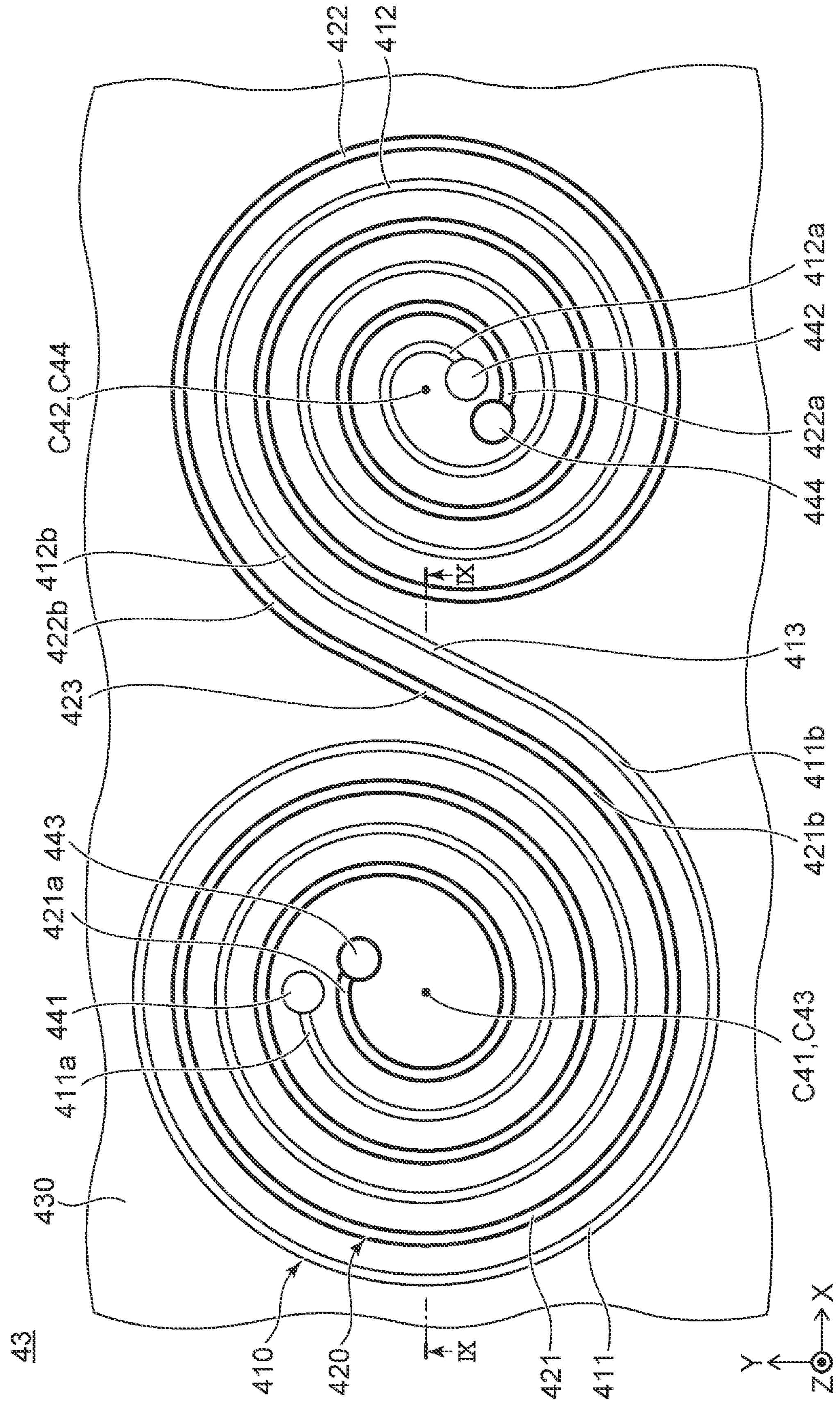
FIG. 8 is a top view showing a portion of an insulating device according to a fourth embodiment.

FIG. 8 is a top view showing a portion of an insulating device according to the embodiment.

Figure 9:
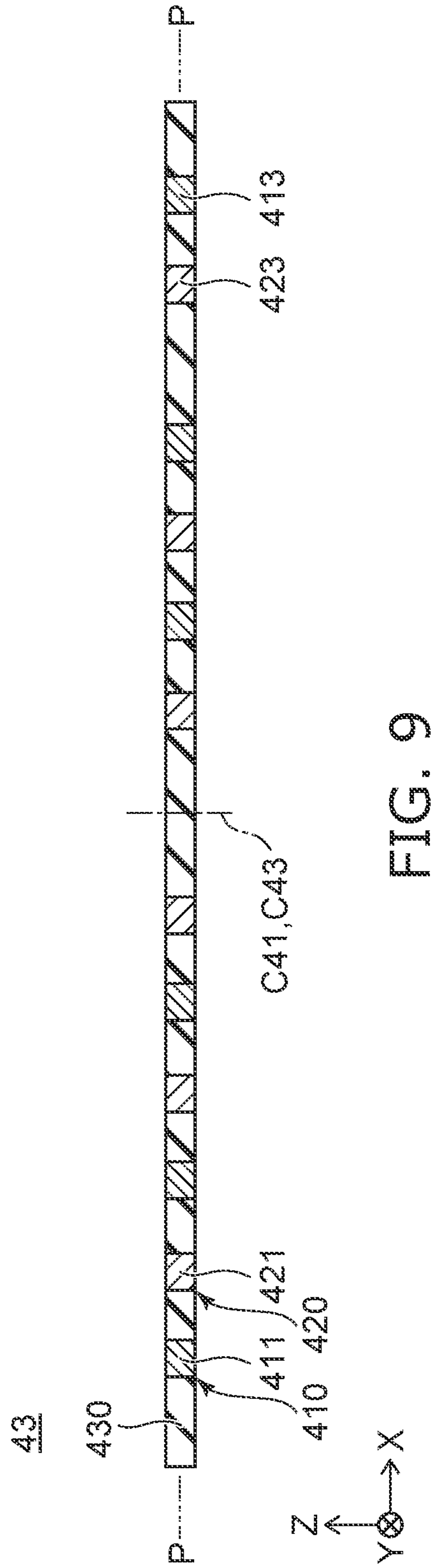
FIG. 9 is a cross-sectional view along line IX-IX of FIG. 8.

FIG. 9 is a cross-sectional view along line IX-IX of FIG. 8.

A first inductor 410 of the insulating device 43 according to the embodiment includes a coil layer 411, a coil layer 412, and a connection portion 413.

A central axis C41 of the coil layer 411 and a central axis C42 of the coil layer 412 extend in the Z-direction; and the coil layer 411 and the coil layer 412 are located in a plane P that is parallel to the X-Y plane. The coil layer 411 and the coil layer 412 are arranged in the X-direction. The coil layer 411 and the coil layer 412 have spiral shapes in which the number of turns each are not less than 1. The distance between the central axis C41 of the coil layer 411 and an outer end portion 411*b* of the coil layer 411 is, for example, greater than the distance between the central axis C42 of the coil layer 412 and an outer end portion 412*b* of the coil layer 412.

A connection member 441 is connected to an inner end portion 411*a* of the coil layer 411. A connection member 442 is connected to an inner end portion 412*a* of the coil layer 412. The connection portion 413 is positioned between the outer end portion 411*b* of the coil layer 411 and the outer end portion 412*b* of the coil layer 412. The connection portion 413 is connected to the outer end portions 411*b* and 412*b*. The connection members 441 and 442 are electrically connected to the first circuit via wiring members (not illustrated) that pass above or below the insulating device 43.

In the first inductor 410, a current flows from the inner end portion 411*a* of the coil layer 411 toward the inner end portion 412*a* of the coil layer 412 or from the inner end portion 412*a* of the coil layer 412 toward the inner end portion 411*a* of the coil layer 411. In the current path of the first inductor 410, the turn direction of the coil layer 411 is opposite to the turn direction of the coil layer 412. Therefore, when a current flows in the first inductor 410, the orientation of the magnetic field generated in the interior of the coil layer 411 is opposite to the orientation of the magnetic field generated in the interior of the coil layer 412.

A second inductor 420 includes a coil layer 421, a coil layer 422, and a connection portion 423.

A central axis C43 of the coil layer 421 is positioned inside the coil layer 411. Specifically, the central axis C43 of the coil layer 421 is substantially aligned with the central axis C41 of the coil layer 411. A central axis C44 of the coil layer 422 is positioned inside the coil layer 412. Specifically, the central axis C44 of the coil layer 422 is substantially aligned with the central axis C42 of the coil layer 412. The coil layer 421 and the coil layer 422 are located in the plane P. The coil layer 421 and the coil layer 422 have spiral shapes in which the number of turns each are not less than 1. The coil layer 421 and the coil layer 422 have a point-symmetric relationship with the midpoint between the central axis C43 and the central axis C44 as the center.

The coil layer 421 has a shape that turns parallel to the coil layer 411. Specifically, the coil layer 421 is formed in two spirals together with the coil layer 411 while being separated from the coil layer 411. The coil layer 422 has a shape that turns parallel to the coil layer 412. Specifically, the coil layer 422 is formed in two spirals together with the coil layer 412 while being separated from the coil layer 412. The distance between the central axis C43 of the coil layer 421 and an outer end portion 421*b* of the coil layer 421 is less than the distance between the central axis C41 of the coil layer 411 and the outer end portion 411*b* of the coil layer 411 and greater than the distance between the central axis C42 of the coil layer 412 and the outer end portion 412*b* of the coil layer 412. Similarly, the distance between the central axis C44 of the coil layer 422 and an outer end portion 422*b* of the coil layer 422 is less than the distance between the central axis C41 of the coil layer 411 and the outer end portion 411*b* of the coil layer 411 and greater than the distance between the central axis C42 of the coil layer 412 and the outer end portion 412*b* of the coil layer 412.

A connection member 443 is connected to an inner end portion 421*a* of the coil layer 421. A connection member 444 is connected to an inner end portion 422*a* of the coil layer 422. The connection portion 423 is positioned between the outer end portion 421*b* of the coil layer 421 and the outer end portion 422*b* of the coil layer 422. The connection portion 423 is connected to the outer end portions 421*b* and 422*b*. The connection members 443 and 444 are electrically connected to the second circuit via wiring members (not illustrated) that pass above or below the insulating device 43.

In the second inductor 420, a current flows from the inner end portion 421*a* of the coil layer 421 toward the inner end portion 422*a* of the coil layer 422 or from the inner end portion 422*a* of the coil layer 422 toward the inner end portion 421*a* of the coil layer 421. In the current path of the second inductor 420, the turn direction of the coil layer 421 is opposite to the turn direction of the coil layer 422. Therefore, when the current flows in the second inductor 420, the orientation of the magnetic field generated in the interior of the coil layer 421 is opposite to the orientation of the magnetic field generated in the interior of the coil layer 422.

The first inductor 410 and the second inductor 420 are located in an insulating layer 430.

In such a configuration as well, the coupling coefficient k can be increased by positioning the coil layers 411 and 421 in the same plane P or by positioning the coil layers 412 and 422 in the same plane P. As described above, the first inductor 410 and the second inductor 420 may not include multiple coil layers stacked in the Z-direction.

Although the first inductor and the second inductor each include multiple coil layers according to the first, second, and third embodiments, the number of coil layers included in one of the first inductor or the second inductor may be 1.

According to embodiments as described above, an insulating device and an isolator are provided in which the transmission efficiency is high.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Additionally, the embodiments described above can be combined mutually.

What is claimed is:

1. An insulating device, comprising:

a first inductor including a first coil layer located in a first plane, and including a third coil layer located in a second plane;

a second inductor separated from the first inductor, the second inductor including a second coil layer located in the first plane, and including a fourth coil layer located in a third plane and electrically connected to the second coil layer, a central axis of the second coil layer being positioned inside the first coil layer; and an insulating layer located between the first inductor and the second inductor, wherein a central axis of the first coil layer extends in an axis direction, the second plane is separated from the first plane in the axis direction, the third plane is separated from the first plane in an opposite direction of the axis direction, the first plane is positioned between the second plane and the third plane, the third coil layer is electrically connected to the first coil layer, a turn direction of the first coil layer and a turn direction of the third coil layer are the same in a current path through the first inductor, a turn direction of the second coil layer and a turn direction of the fourth coil layer are the same in a current path through the second inductor, the second coil layer has a spiral shape with multiple turns, the fourth coil layer has a spiral shape with multiple turns, and an outer end portion of the second coil layer is electrically connected to an inner end portion of the fourth coil layer in the axis direction.

2. The device according to claim 1, wherein the first coil layer and the third coil layer partially overlap when viewed along the axis direction.

3. The device according to claim 1, wherein the first inductor further includes a first conductive member positioned between the first coil layer and the third coil layer and connected to the first coil layer and the third coil layer.

4. The device according to claim 1, wherein the third coil layer includes two adjacent portions in a cross section of the third coil layer, the cross section is parallel to a central axis of the third coil layer and includes the central axis of the third coil layer, and a distance between the first coil layer and the second coil layer is greater than a distance between the two adjacent portions of the third coil layer.

5. The device according to claim 1, wherein the second coil layer is positioned inside the first coil layer, and a distance between an outer end portion of the fourth coil layer and a central axis of the fourth coil layer is greater than a distance between an outer end portion of the third coil layer and a central axis of the third coil layer.

6. The device according to claim 1, wherein the first inductor further includes:

a fifth coil layer located in the first plane and aligned with the first coil layer in a direction parallel to the first plane;

a sixth coil layer located in the second plane and electrically connected to the fifth coil layer, a central axis of the sixth coil layer being positioned inside the fifth coil layer when viewed along the axis direction; and a first connection portion connected to the third and sixth coil layers, turn directions of the fifth and sixth coil layers are opposite to the turn directions of the first and third coil layers in the current path through the first inductor, the second inductor further includes:

a seventh coil layer located in the first plane, a central axis of the seventh coil layer being positioned inside the fifth coil layer;

an eighth coil layer located in the third plane and electrically connected to the seventh coil layer, a central axis of the eighth coil layer being positioned inside the seventh coil layer; and a second connection portion connected to the fourth and eighth coil layers, and turn directions of the seventh and eighth coil layers are opposite to the turn directions of the second and fourth coil layers in the current path through the second inductor.

7. An isolator, comprising:
- the insulating device according to claim 1;
- a first circuit electrically connected to the first inductor; and
- a second circuit electrically connected to the second inductor, wherein
- one of the first circuit and the second circuit is a transmitting circuit, and
- another of the first circuit and the second circuit is a receiving circuit.

* * * * *